(12) United States Patent
Parthasarathy et al.

(10) Patent No.: US 8,913,336 B2
(45) Date of Patent: *Dec. 16, 2014

(54) CONSTRAINED ON-THE-FLY INTERLEAVER ADDRESS GENERATOR CIRCUITS, SYSTEMS, AND METHODS

(71) Applicant: STMicroelectronics, Inc., Coppell, TX (US)

(72) Inventors: Sivagnanam Parthasarathy, Carlsbad, CA (US); Shayan Srinivasa Garani, San Diego, CA (US); Sudha Thipparthi, Los Angeles, CA (US)

(73) Assignee: STMicroelectronics, Inc., Coppell, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/146,032

(22) Filed: Jan. 2, 2014

(65) Prior Publication Data

US 2014/0111882 A1     Apr. 24, 2014

Related U.S. Application Data

(63) Continuation of application No. 12/896,757, filed on Oct. 1, 2010, now Pat. No. 8,625,220.

(60) Provisional application No. 61/247,913, filed on Oct. 1, 2009.

(51) Int. Cl.
*G11B 5/09*    (2006.01)
*G11B 20/18*    (2006.01)
*G11B 27/30*    (2006.01)

(52) U.S. Cl.
CPC ........ *G11B 27/3027* (2013.01); *G11B 20/1866* (2013.01); *G11B 2220/2516* (2013.01); *G11B 20/1833* (2013.01); *G11B 2020/185* (2013.01)
USPC .................................. 360/49; 360/40; 360/39

(58) Field of Classification Search
None
See application file for complete search history.

(56) References Cited

U.S. PATENT DOCUMENTS

| | | | |
|---|---|---|---|
| 7,023,946 B2 | 4/2006 | Sawada et al. | |
| 7,545,256 B2 * | 6/2009 | O'Toole et al. | 340/10.2 |
| 7,788,560 B2 * | 8/2010 | Argon et al. | 714/728 |
| 7,832,842 B2 | 11/2010 | Jackson Pulver et al. | |
| 8,625,220 B2 * | 1/2014 | Parthasarathy et al. | 360/49 |

* cited by examiner

*Primary Examiner* — Muhammad N Edun
(74) *Attorney, Agent, or Firm* — Seed IP Law Group PLLC

(57) ABSTRACT

An interleave address generation circuit includes a plurality of linear feedback shift registers operable to generate addresses for permuting a data block in a first domain to a data block in a second domain on a subword basis. The interleave address generation circuit is operable to generate the lane addresses for each subword and the linear feedback registers configured to generate circulant addresses and sub-circulant address to map bits in each subword in the data block in the first domain to a corresponding subword in the second domain.

15 Claims, 10 Drawing Sheets

FIG. 5

| | 0 | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|
| 32 | 4096 | 4100 | 4104 | 4108 | 4112 | 4116 | 4120 | 4124 | 4128 | 4132 | 4136 | 4140 | 4144 | 4148 | 4152 | 4156 | 4160 |
| 33 | 4224 | 4228 | 4232 | 4236 | 4240 | 4244 | 4248 | 4252 | 4256 | 4260 | 4264 | 4268 | 4272 | 4276 | 4280 | 4284 | 4288 |
| 34 | 4352 | 4356 | 4360 | 4364 | 4368 | 4372 | 4376 | 4380 | 4384 | 4388 | 4392 | 4396 | 4400 | 4404 | 4408 | 4412 | 4416 |

| | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|
| | 4160 | 4164 | 4168 | 4172 | 4176 | 4180 | 4184 | 4188 | 4192 | 4196 | 4200 | 4204 | 4208 | 4212 | 4216 | 4220 |
| | 4288 | 4292 | 4296 | 4300 | 4304 | 4308 | 4312 | 4316 | 4320 | 4324 | 4328 | 4332 | 4336 | 4340 | 4344 | 4348 |
| | 4416 | 4420 | 4424 | 4428 | 4432 | 4436 | 4440 | 4444 | 4448 | 4452 | 4456 | 4460 | 4464 | 4468 | 4472 | 4476 |

CONSTRAINED ON-THE-FLY INTERLEAVER ADDRESS GENERATOR CIRCUITS, SYSTEMS, AND METHODS

PRIORITY CLAIM

This application is a continuation of commonly owned, copending U.S. patent application Ser. No. 12/896,757, filed Oct. 1, 2010; which application claims benefit of U.S. Provisional Patent Application No. 61/247,913, filed Oct. 1, 2009; all of the foregoing applications are incorporated by reference herein in their entireties.

TECHNICAL FIELD

Embodiments of the present invention relate generally to data communications and relate more specifically to the interleaving and deinterleaving of data being communicated over a communications channel.

BACKGROUND

Digital transmission systems commonly involve techniques for the detection of digital data represented by a sequence of symbols, where a symbol typically encodes or represents a number of bits. Symbols are transferred as signals through a communications channel, such as a magnetic or optical storage disk channel or a wireless channel. During transfer through a communications channel noise is typically undesirably added to the transmitted signals. In a magnetic recording communications channel, for example, data symbols are written to and stored on a magnetic medium through an encoding process and then read from the magnetic medium through a decoding process. For processing convenience, the encoding and decoding processes operate on blocks of data, each block of data representing a portion of an input data sequence.

Many communications channels can experience a phenomenon known as "burst errors," where a burst error is generally considered to be a contiguous sequence of symbols being transferred through a communications channel such that the first and last symbols in the sequence are in error. Noise corrupts a transmitted signal representing the sequence of symbols for a period of time equivalent to the period of several encoded or decoded being transmitted. The noise thus results in a group or "burst" of erroneous symbols that undesirably increases the bit error rate (BER) of the communications channel. Furthermore, in communications channels that involve iterative decoding, such as channels utilizing low density parity check (LDPC) codes in the encoding and decoding processes, burst errors can be difficult to correct since such burst errors can happen in a concentrated manner to relatively large numbers of consecutive symbols.

Many communications channels, such as magnetic storage communications channels, interleave encoded data such that the data of respective symbols in a block of data are permuted. Interleaving distributes data so that burst errors affect only a relatively small number of bits in each symbol or group of symbols for which error checking and correction is performed during the encoding and decoding processes. In this way, interleaving the symbols in a block of data prior to transmission of the block through the channel distributes burst errors throughout the deinterleaved block. This enables the erroneous bits in the deinterleaved block to be corrected through error correction utilized in such communications channels.

Nearly all communication channels use some form of error correction coding, which generally involves adding redundant information to a stream of data to enable bit errors that arise during communication to be detected and corrected. Iterative correction codes, such as turbo codes and low-density parity-check (LDPC) codes, are increasingly utilized in many communications channels, such as communications channels for magnetic storage systems. LDPC codes are a class of linear block codes which provide a near capacity performance on a large collection of communications channels, as will be appreciated by those skilled in the art. In a magnetic storage system utilizing LDPC codes, data to be written is encoded to generate a corresponding code word. If the number of erroneous bits within a given code word exceeds the error-correcting capability of the LDPC code, then the original code word and thus the original data cannot be recovered. Interleaving rearranges symbols across several codewords, creating a more uniform distribution of errors such that when deinterleaved erroneous bits are distributed across enough codewords that enable error correction to be performed on respective codewords. Improved interleaving and deinterleaving techniques are desirable.

SUMMARY

An embodiment of the present invention is directed to an interleave address generation circuit that includes a plurality of linear feedback shift registers operable to generate addresses for permuting a data block in a first domain to a data block in a second domain on a subword basis. The interleave address generation circuit is operable to generate the lane addresses for each subword and the linear feedback registers configured to generate circulant addresses and sub-circulant address to map bits in each subword in the data block in the first domain to a corresponding subword in the second domain.

BRIEF DESCRIPTION OF THE DRAWINGS

FIG. 5 is a table that can be utilized by the IAG circuitry of FIG. 4 to constrain the generation of sub-circulant addresses given a particular circulant address according to one embodiment of the present invention.

DETAILED DESCRIPTION

In the present description, certain details are set forth in conjunction with the described embodiments of the present invention to provide a sufficient understanding of the invention. One skilled in the art will appreciate, however, that the invention may be practiced without these particular details. Furthermore, one skilled in the art will appreciate that the example embodiments described below do not limit the scope of the present invention, and will also understand that various modifications, equivalents, and combinations of the disclosed embodiments and components of such embodiments are within the scope of the present invention. Embodiments including fewer than all the components of any of the respective described embodiments may also be within the scope of the present invention although not expressly described in detail below. Finally, the operation of well-known components and/or processes has not been shown or described in detail below to avoid unnecessarily obscuring the present invention.

An interleaver permutes encoded data such that the data of respective symbols in a block of data are rearranged within the block. This results in burst errors affecting only a relatively small number of bits in each symbol or group of symbols for which error checking and correction is performed, as previously mentioned above. For example, one way to perform the interleaving function is through a block array in which symbols are written into the data array in a first order and read out of the array in a second order. In this way, a block of data having first addresses in a first domain is mapped to second addresses in a second domain to thereby interleave the data bits forming the block. A simple example would be to take all bits in even addresses in the first domain and map each bit into a corresponding odd address in the second domain, or vice versa. Another simple example is the generation of a plurality of pseudorandom addresses for an address space required for interleaving the block of data and storing these addresses in a memory to effectively function as a look-up table for use in mapping the data from the first domain to the second domain.

This address mapping should occur so that the bits are randomly—pseudo-randomly in practical implementations—mapped from the first domain to the second domain. Furthermore, error correction is typically utilized in communications channels and in this situation the block of data will include user data bits along with parity bits generated by the error correction for the user data bits. The parity bits must also be pseudo-randomly mapped from the first domain to the second domain and also be evenly distributed throughout the interleaved block of data in order to maximize the effectiveness of the interleaving in reducing burst errors thereby improve the performance of the communications channel.

Figure 1:
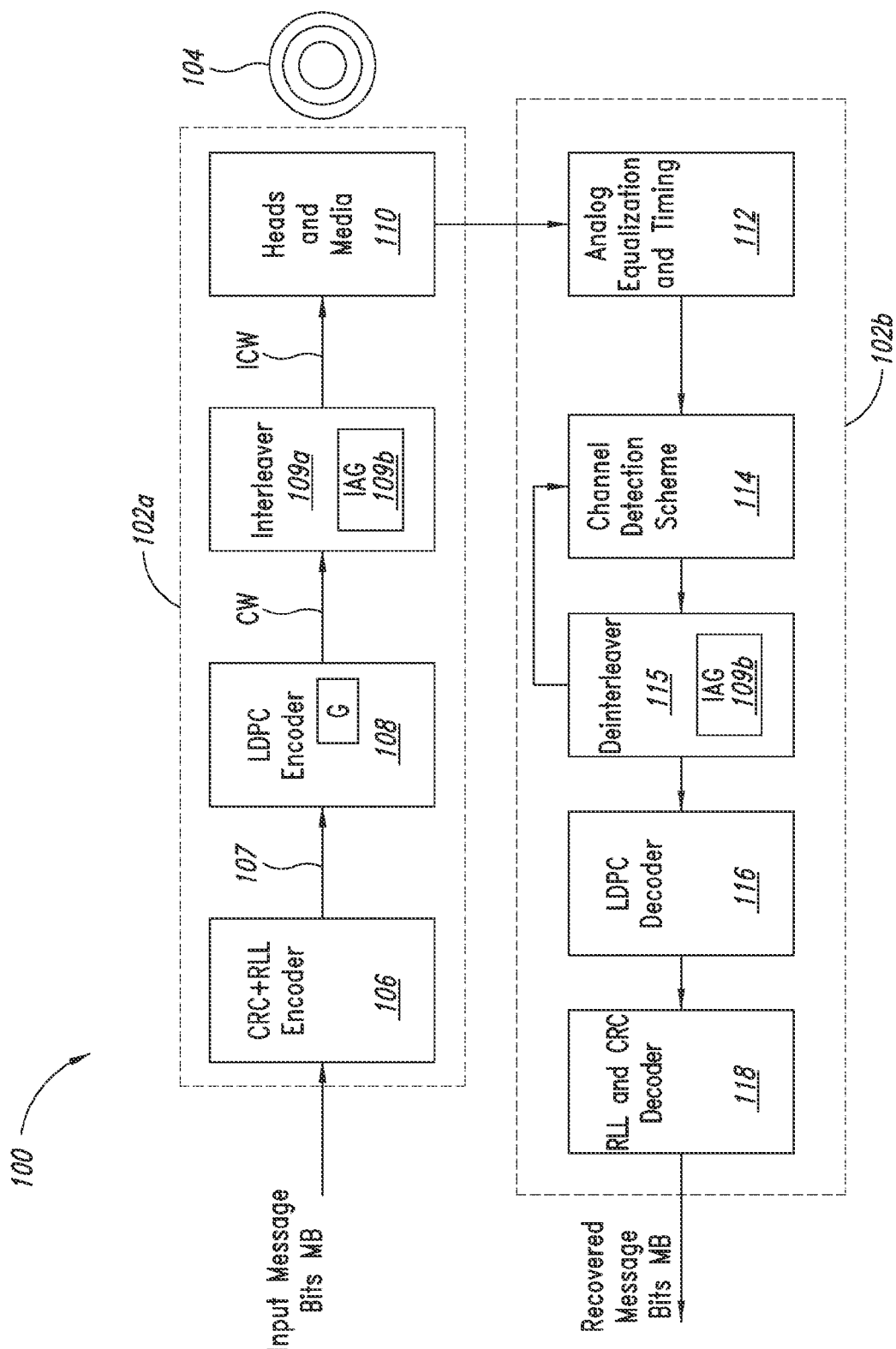
FIG. 1 is a functional block diagram of a communications channel including an interleaver and deinterleaver that utilize an interleaver address generation (IAG) circuitry according to an embodiment of the present invention.

Embodiments of the present invention utilize linear feedback shift registers (LFSR) to generate the pseudorandom addresses for performing the interleaving and deinterleaving functions on blocks of data being communicated through a communications channel. FIG. 1 is a functional block diagram of a communications channel 100 including interleave and deinterleave circuitry according to an embodiment of the present invention. The communications channel 100 includes a write portion 102a that encodes received message bits MB utilizing a low density parity check (LDPC) code and stores these encoded message bits on a storage medium 104, such as a magnetic or optical disk or other suitable type of memory device. A read portion 102b reads the encoded data from the storage medium 104 and decodes this encoded data to thereby output the recovered or originally stored message bits MB from the communications channel 100.

There are k message bits MB that are input to the write portion 102a. More specifically, in the write portion 102a a cyclic redundancy check (CRC) and run length limited (RLL) encoder 106 receives the k message bits MB. First, the encoder 106 applies a CRC code to the k message bits to generate CRC coded data from the message bits. CRC coded data is generated for each k-bit block of message bits MB. The encoder 106 then performs RLL encoding on the CRC coded data to thereby generate RLL encoded data 107. The RLL encoding helps with timing requirements for accurately reading data from the storage medium 104, as will be appreciated by those skilled in the art.

The encoder 106 provides the RLL encoded data 107 to an LDPC encoder 108 that includes a generator matrix G for encoding the RLL encoded data to generate codewords CW of the LDPC code. An LDPC code includes the generator matrix G for encoding data into corresponding codewords CW and a parity check matrix H and corresponding Tanner graph for decoding the codewords, as will be appreciated by those skilled in the art. Each codeword CW from the LDPC encoder 108 includes user data bits and parity bits and is output to an interleaver 109a that includes interleave address generation (IAG) circuitry 109b containing a plurality of linear feedback shift registers (LFSRs), which are not shown in FIG. 1 but which will be described in more detail below. The interleaver 109a utilizes mapping addresses generated by the IAG circuitry 109b to interleave the user data and parity bits in the codewords CW to generate interleaved codewords ICW that are then applied to heads and media circuitry 110 which, in turn, stores these interleaved codewords on the storage medium 104.

During a read operation, the read portion 102b reads data stored on the storage medium 104 and processes the data to output the originally stored message bits MB. More specifically, the read portion 102b includes analog equalization and timing circuitry 112 that works in combination with the heads and media circuitry 110 to sense data stored on the storage medium 1204. The detailed operation of the analog equalization and timing circuitry 112, heads and media circuitry 110, and other components in a communication channel 100 will be understood by those skilled in the art and thus are not described in more detail than necessary herein in order to avoid unnecessarily obscuring aspects of the present invention. Briefly, the equalization and timing circuitry 112 equalizes analog signals from the heads and media circuitry 110 that are generated in sensing data stored on the storage medium 104. This equalization compensates for intersymbol interference (ISI) in the signal from the heads and media circuitry 110 that corresponds to the data being sensed from the storage medium 104. The analog equalization and timing circuitry 112 also performs analog-to-digital conversion of the equalized signal and outputs equalized samples that are digital signals corresponding to the data being read.

Channel detection scheme circuitry 114 receives the equalized samples from the analog equalization and timing circuitry 112. The channel detection scheme circuitry 114 performs the iterative decoding of the equalized samples using an associated iterative decoding algorithm, typically the soft output Viterbi algorithm (SOVA) or the BCJR algorithm, as will be appreciated by those skilled in the art. The channel detection scheme circuitry 114 outputs soft decisions or soft information values, namely log-likelihood ratios (LLRs) of the detected bits to a deinterleaver 115 that deinterleaves the received soft information values using addresses generated by the IAG circuitry 109b. This deinterleaving restores the soft information values to their original addresses, meaning the soft information value representing each bit is in its original position as it was in the codeword CW output by the LDPC encoder 108. In this was the deinterleaver 115 utilizes the IAG circuitry 109b to map the soft information values that collectively represent the interleaved code word ICW to soft information values that collectively represent the codeword CW.

An LDPC decoder 116 receives these soft information values that collectively represent the codeword CW and decodes these values to generate the RLL encoded data 107 originally supplied to the LDPC encoder 108. There is feedback between the channel detection scheme circuitry 114 and the LDPC decoder 116 using standard turbo-equalization techniques, as will be understood by those skilled in the art. The LDPC decoder 116 then outputs codewords of the RLL encoded data 107 to RLL and CRC decode circuitry 118 which operates to decode the previous RLL encoding and utilizes the CRC codes to determine the accuracy of the data being read. Once the RLL and CRC decode circuitry 118 has decoded these codewords the circuitry outputs the message bits MB originally input to the communications channel 100.

Note that although the heads and media circuitry 110 is shown as being contained in the write portion 102a, this circuitry can be viewed as belonging to both the write portion and read portion 102b since the circuitry functions to access data stored on the storage medium 104 during both read and write operations of the communications channel 100. Also it should be noted that the storage medium 104 can include different types of storage media in different embodiments of the present invention, such as magnetic disks, optical disks, FLASH memory, and so on.

Figure 2:
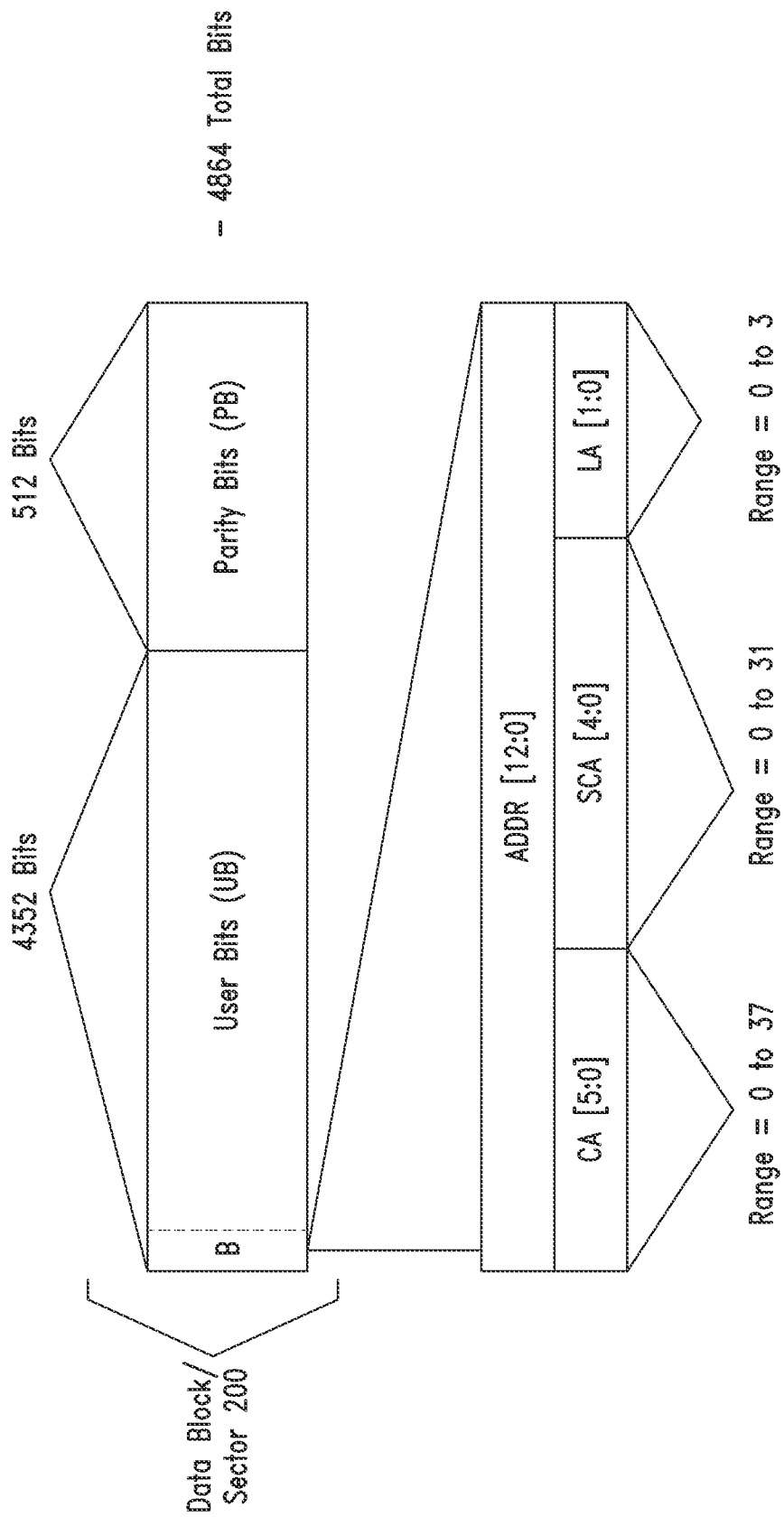
FIG. 2 a diagram illustrating the various fields forming a mapping address in interleaved subword (ISW) format and deinterleaved subword (DSW) format for codewords in the embodiment of FIG. 1.

The structure and operation of the IAG circuitry 109b according to one embodiment of the present invention will now be described in more detail with reference to FIGS. 2-4. FIG. 2 illustrates various fields that form a mapping address in interleaved subword (ISW) format and deinterleaved subword (DSW) format in embodiments of the present invention. Referring to FIG. 2, the format of a mapping address ADDR [12:0] generated by the IAG circuitry 109b is shown where each such mapping address is a thirteen-bit address in order to map each bit B in a data block 200 that can be up to 4864 bits long including. Each data block 200 includes up to 4352 user bits UB of data along with 512 parity bits PB generated for these user bits by the LDPC encoder 108 (FIG. 1) that are to be collectively transferred over the communications channel 100. The data block 200 accordingly includes up to 4864 bits with the IAG circuitry 109b generating an address ADDR[12: 0] for each bit. These addresses map the bit from a first domain termed the LDPC decoder domain to a second domain termed the intersymbol interference (ISI) domain during interleaving by the interleaver 109a. The addresses ADDR[12:0] map from the ISI domain to the LDPC decoder domain during deinterleaving by the deinterleaver 115. The IAG circuitry 109b generates the addresses ADDR[12:0] so that the parity bits PB bits are pseudo-randomly distributed within the block of data 200 in the ISI domain.

The format of deinterleaver/interleaver address ADDR[12: 0] is shown in FIG. 1 as including a circulant address CA[5: 0], a sub-circulant address SCA[4:0], and a lane address LA[1:0]. The range of values for each of these sub-addresses is given by the respective number of bits, except for the CA[5:0] address, as indicated in FIG. 1. Thus, the range of values for the lane address LA[1:0] is 0-3, the range of values for the sub-circulant address SCA[4:0] is 0-31, and the range of values for the circulant address CA[5:0] is from 0-37 (these six bits could provide values up of 0-64 but only the 38 values 0-37 are used in this embodiment).

The information in the data block 200 in the ISI domain contains information in interleaved subword (ISW) format where the data or user bits DB and parity bits PB are interleaved. Each interleaved subword ISW includes 152 (4×38) soft decision values and there are 32 interleaved subwords in a 512 byte sector (4096 user bits UB in data block 200). The information in the data block 200 in the LDPC decoder domain contains information in deinterleaved subword (DSW) format and there are 32 deinterleaved subwords DSW in each LDPC codeword CW. The data block 200 shown in FIG. 1 is in the LDPC decoder domain and thus includes 32 deinterleaved subwords DSW.

The requirements for operation of the IAG circuitry 109b in generating the addresses ADDR[12:0] for operation of the deinterleaver 115 (mapping from ISWs in the ISI domain to DSWs in the LDPC decoder domain) are given below. In the described embodiment the LLR values provided by the channel detection scheme circuit 114 (FIG. 1) are organized into a pack buffer of 38×4 before these values are written using the corresponding subcirculant addresses SCA[4:0]. This is repeated 38 times and four unique lane addresses LA[1:0] are generated. This results in a total of 152 addresses (4 LA[1:0] addresses times 38 circulant addresses CA[5:0]) thus generated with each address having its associated land address LA[1:0], sub-circulant address SCA[4:0], and circulant address CA[5:0].

Once 38 unique circulant addresses CA[5:0] components per lane address LA[1:0] have been generated, there must also be 38 sub-circulant addresses SCA[4:0], one corresponding to each of the 38 circulant addresses CA[5:0]. The circulant addresses CA[5:0] on a lane address LA[1:0] basis provide the address for the incoming LLR values (from the detection scheme circuitry 114). Also note that 16 addresses (512 PB/32 ISW=16) for the parity bits PB portion of the data block 200 (FIG. 1) with circulant address CA[5:0] values 34 to 37 (4 each) are to be generated by the time the required 4 unique addresses, one for each lane, has been repeated 38 times. These 16 addresses correspond to locations of the parity bits PB in the interleaved subword ISW and should be pseudo-randomly distributed the interleaved subword.

There are 32 interleaved subwords ISW in a 512 byte sector so the generation of 4 unique lane addresses LA[1:0] is repeated 38 times (CA[5:0]) and this is repeated 32 times (SCA[4:0]). At the end of the mapping through the generated mapping addresses ADDR[12:0] for the entire data block there are unique mapping addresses that have been generated for the entire data block 200. As part of this mapping there are 32 unique sub-circulant addresses SCA[4:] for every circulant address CA[5:0] and for each lane address LA[1:0].

The data blocks 200 may also be referred to as a "sector" herein. For sector 200 sizes smaller than the maximum size of 38×4×32=4864 bits (see FIG. 1), the following mapping of addresses applies. The interleaved subwords ISW can now be either 144 or 148 entries, with the zero-padding assumed to be either in row 32 or 33 depending on the sector size. Zero-padding means that zeroes are inserted in these locations to effectively maintain the overall size of the sector at 4864 bits by inserting zeroes at selected locations. The 16 addresses for the 512 parity bits (512 PB/32 ISW=16) with circulant address CA[5:0] values 34 to 37 (4 each) must still be generated for each interleaved subword ISW. The addresses corresponding to the zero-pad locations are skipped but 4 unique addresses per cycle are generated obeying lane constraints. Interleaved subword ISW markers are provided when all the addresses corresponding to the pack buffer size are generated, which can happen after 144, 148 or 152 entries. The ADDR [12:0] addresses generated by the IAG circuitry 109b, as previously mentioned, must be pseudo-random.

Figure 3:
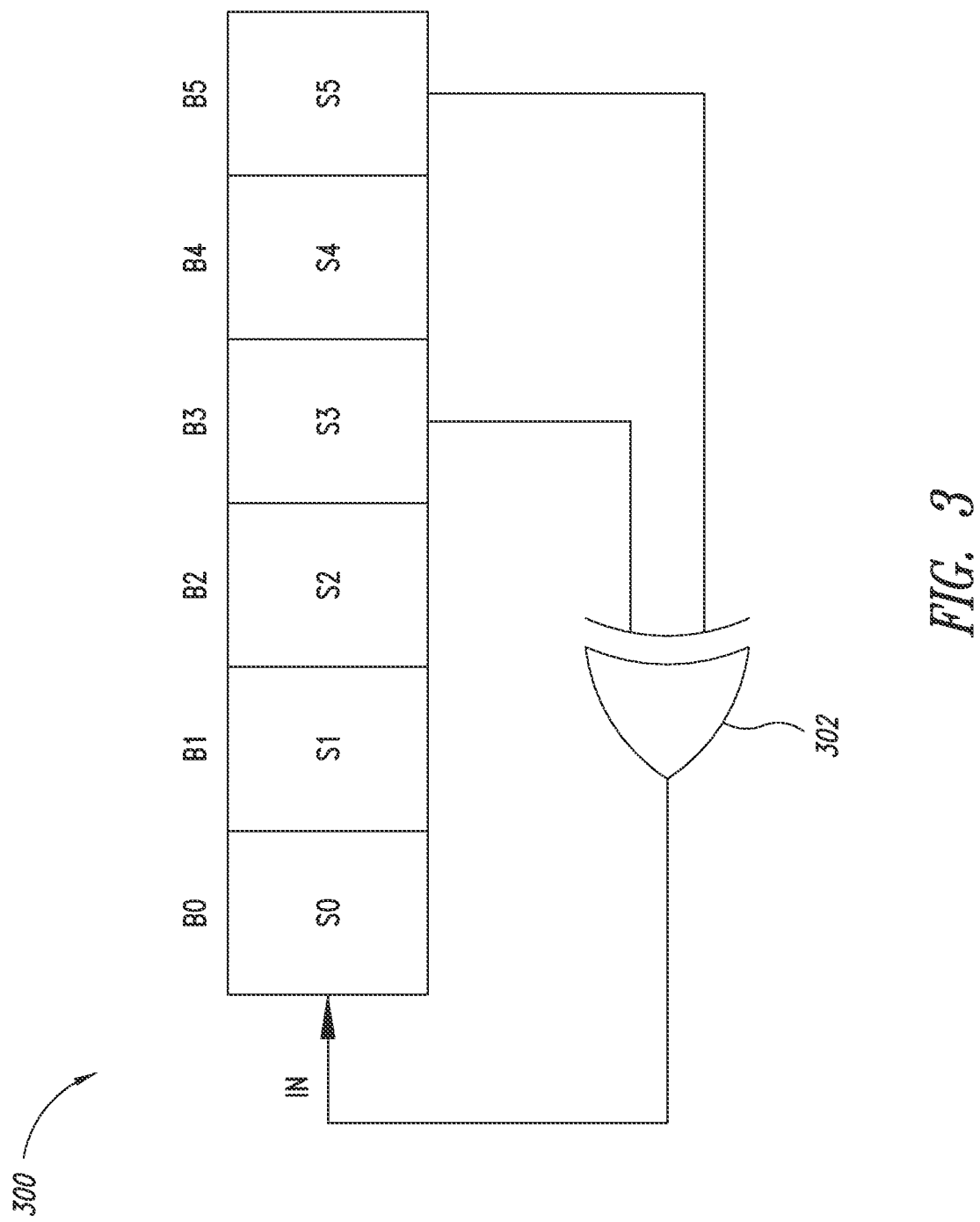
FIG. 3 is a functional block diagram of a conventional linear feedback shift register (LFSR) as used in the interleaver and deinterleaver of FIG. 1.
Figure 4:
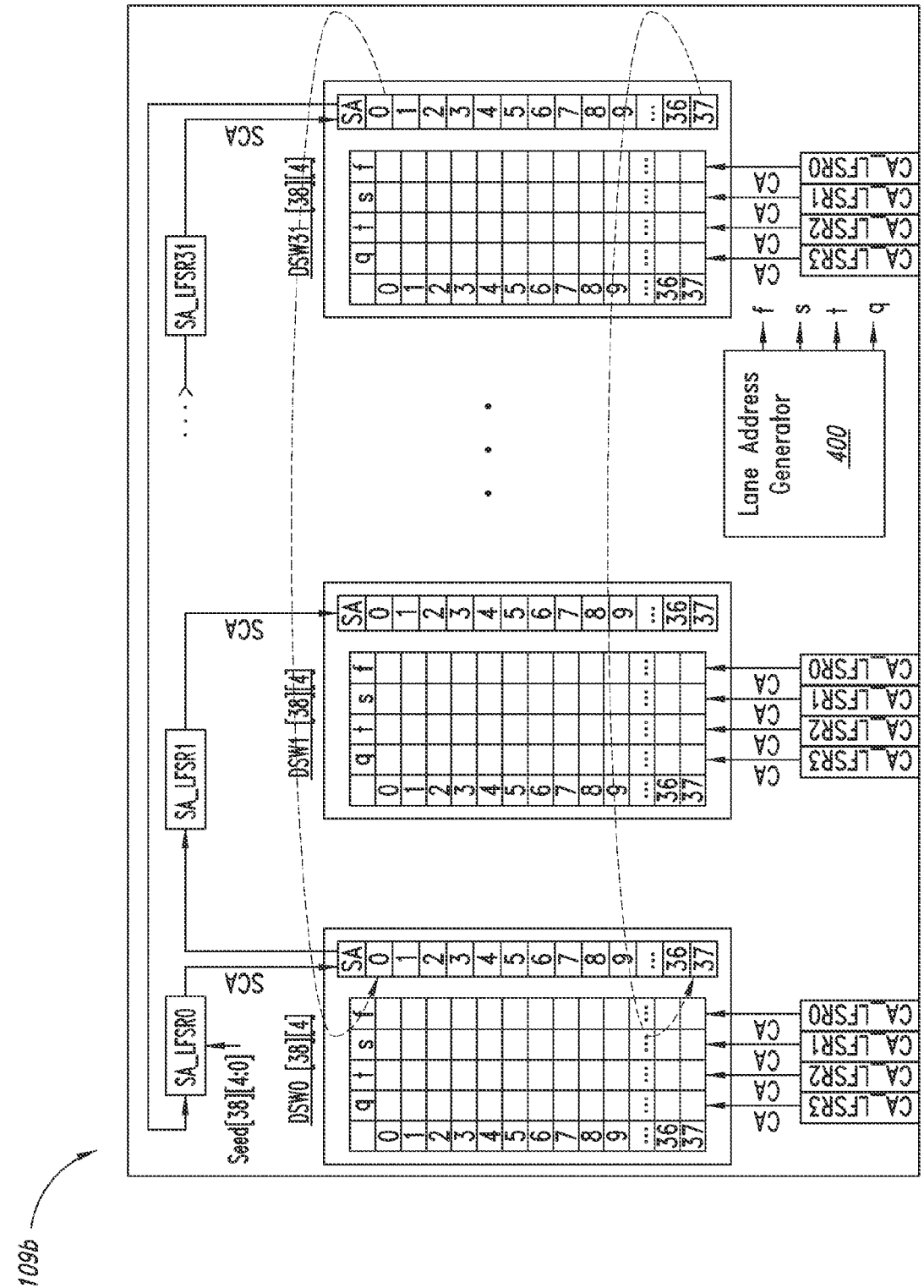
FIG. 4 is a functional block diagram of an interleave address generation (IAG) circuitry including a plurality of LFSRs for generating mapping addresses according to one embodiment of the present invention.

Before describing the embodiment of the IAG circuitry 109b in FIG. 4, a conventional linear feedback shift register (LFSR) 300 shown in FIG. 3 will be briefly described to provide a brief foundation for some of the terms used in describing the operation of the IAG circuitry 109b of FIG. 3 and the LFSRs forming this circuitry. A linear feedback shift register LFSR is a shift register whose input bit is a linear function of its previous state by generating a new input value IN each clock cycle, the new input bit having a value that is determined by the XOR of selected bits contained in stages S of the LFSR. The initial value stored in the stages S of an LFSR is called the "seed" or "seed value." An LFSR generates a sequence of values that with the proper selection of feedback of bits stored in selected stages S can produce a repeating sequence of bits that is pseudo random in nature. The LFSR 300 of FIG. 3 includes feedback or "taps" on stages S3 and S5 as seen in the figure. The LFSR 300 can be viewed as a binary polynomial as defined by the taps and in the example of FIG. 3 the LFSR may be represented by the polynomial $X^5+X^3+1$. In operation, as the LFSR 300 is clocked data bits stored in the stages S0-S5 are shifted to the right and a new input value from the XOR gate 302 is shifted into stage S0.

FIG. 3 is a functional block diagram of the IAG circuitry 109b including a plurality of LFSRs for generating mapping addresses according to one embodiment of the present invention. The IAG circuitry 109b includes 32 sets of circuitry for mapping the 152 bits in each of the 32 deinterleaved subwords DSW0-DSW31 forming each data block or sector 200. Recall, as discussed above, each data block or sector 200 (FIG. 2) includes up to 4862 bits, with each DSW0-DSW32 subword containing 152 bits such that 152 bits/DSW×32 DSWs=4864 bits. Note that each DSW0-DSW32 subword is arranged for the address mapping as previously discussed, namely mapping addresses ADDR[12:0] for that DSW subword have the corresponding lane address LA[1:0], sub-circulant address SCA[4:0], and circulant address CA [5:0] portions thereof. In FIG. 4 the addresses for the bits of each DSW subword are depicted as a 38 rows time 4 columns (38×4) array that may be referred to as an array space herein.

Turning now to the embodiment of FIG. 4, for each DSW0-DSW32 subword the IAG circuitry 109b includes four circulant address linear feedback shift registers (LFSR) CA_LFSR0-3 that each generates corresponding circulant addresses CA[5:0]. This is shown for the DSW0 subword with the circulant addresses CA[5:0] being designated as simply as CA in the figure. Furthermore, the IAG circuitry 109b further includes a sub-circulant address LFSR SA_LFSR0-31 for each DSW0-DSW32 subword, respectively. Furthermore, the IAG circuitry 109b further includes a sub-circulant address LFSR SA_LFSR0-31 for each DSW0-DSW32 subword, respectively. Each sub-circulant address LFSR SA_LFSR0-31 generates a sub-circulant address SCA [4:0] for the corresponding DSW subword, with the generated sub-circulant address being designated as SCA in the figure. Finally, the IAG circuitry 109b further includes a lane address generator 400 that effectively generates the lane address LA[1:0] the controls which column or lane in the array space of each DSW subword for which addresses are generated. In the example of FIG. 4 the lane address generator 400 sequentially activates four signals, a first signal f, a second signal s, a third signal t, and a fourth signal q. The activated signal f, s, t, q effectively corresponds to or defines the current lane address LA[1:0].

In the embodiment of FIG. 4, the each of the four circulant address LFSRs CA_LFSR0-3 for each DSW0-31 subword is an LFSR of degree 6, namely has the polynomial representation $x^6+x^5+1$ meaning that the bit stored in the sixth stage and the fifth stage are XOR'd and the result input to the initial stage of the LFSR. Moreover, each of the 32 sub-circulant address LFSRs SA_LFSR0-31 is an LFSR of degree 5 and thus has the polynomial representation $x^5+x^3+1$. Each of these circulant address LFSRs CA_LFSR0-3 and sub-circulant address LFSRs SA_LFSR0-31 operates independent of each other.

The four circulant address LFSRs CA_LFSR0-3 for each DSW subword generates the circulant addresses for the corresponding subword on a per-lane basis. Only the circulant address LFSRs CA_LFSR0-3 for the DSW0 subword will now be described in more detail because the operation of the circulant address LFSRs for each of the DSW1-31 subwords is the same. The circulant address LFSR CA_LFSR0 generates the 38 (0-37) circulant addresses for the lane 0, corresponding to the far right column (selection signal f from lane address generator 400) in the array space for the DSW0 subword. Furthermore, an independent starting seed value is stored in the circulant address LFSR CA_LFSR0. The circulant address LFSR CA_LFSR1 operates in the same way for lane 1 (column receiving the selection signal s from lane address generator 400) and receives its own starting seed value. Similarly, the circulant address LFSRs CA_LFSR2 and CA_LFSR3 operate in the same way for lanes 2 and 3, respectively, and each receives its own starting seed value.

The sub-circulant LFSRs SA_LFSR0-31 are each of degree 5, namely has the polynomial representation $x^5+x^3+1$ meaning that the bit stored in the fifth stage and the third stage are XOR'd and the result input to the initial stage of the LFSR. The sub-circulant LFSRs SA_LFSR0-31 each work with a seed array Seed[38][4:0] where an initial seed array is input to the sub-circulant LFSR0 associated with DSW0. Thereafter, for each of the sub-circulant LFSRs SA_LFSR1-31 the seed array Seed[38][4:0] is provided as the 38 circulant addresses generated by the prior sub-circulant LFSR as shown through the arrows in FIG. 4. More specifically, the seed array for sub-circulant LFSR SA_LFSR1 is supplied by the 38 sub-circulant addresses SCA[4:0] generated by sub-circulant LFSR SA_LFSR0, the seed array for sub-circulant LFSR SA_LFSR2 is supplied by the 38 sub-circulant addresses SCA[4:0] generated by sub-circulant LFSR SA_LFSR1, and so on, with the seed array for sub-circulant LFSR SA_LFSR0 after the initial operation being supplied by the 38 sub-circulant addresses SCA[4:0] generated by sub-circulant LFSR SA_LFSR31.

Note that in other embodiments a single 5 stage LFSR can be utilized 38 times with a corresponding seed array each of these times to generate the 38 sub-circulant addresses SCA [4:0] for each of the DSW0-31 subwords. It should also be noted that the circulant address LFSRs CA_LFSR0-3 are each capable of generating numbers in the range 0-63 (i.e., $2^6-1$). Accordingly, since only sub-circulant addresses in the range 0-37 are required numbers greater than 39 have to be skipped and the number 38 is mapped to the sub-circulant address value 0. Moreover, it has been established that a look-ahead of 4 steps is sufficient to ensure that the circulant LFSRs CA_LFSR0-3 always generate numbers in the range 1 to 38 (value 38 being mapped to 0 as just mentioned).

In operation, the IAG circuitry 109b of FIG. 4 initially stores four initial seed values into the circulant address LFSRs CA_LFSR0-3 and loads the initial seed value Seed[4:0] into the SA_LFSR0 LFSR and uses this initial seed value to generate the required remaining 37 seed values. Alternatively, one can expose all the 38 initial seed registers that are used by the SA_LFSR. The IAG circuitry 109b controls the lane address generator 400 to generate a first given lane address LA[1:0] (i.e., activates signal f, s, t, or q). The IAG circuitry 109b clocks the corresponding LFSR CA_LFSR0 to generate a corresponding circulant address CA[5:0]. The sub-circulant LFSR SA_LFSR0 is then clocked to generate 32 unique sub-circulant addresses SCA[4:0] for the given lane address LA[1:0] and circulant address CA[5:0]. This process is then repeated for each of the three remaining lane addresses LA[1:0] and 37 remaining circulant addresses CA[5:0] to thereby cover the entire address space uniquely and completely. The randomness of the IAG circuitry 109b address generation is facilitated by the independent circulant address LFSRs CA_LFSR and sub-circulant address LFSRs SA_LFSR that operate on a seed/circulant basis. In operation, the IAG circuitry 109b pipelines sub-circulant addresses SCA [4:0] in that a set of sub-circulant address are generated for the next DSW/ISW subword while the current DSW/ISW subword is being processed.

The sub-circulant LFSRs SC_LFSR can also be implemented using a degree 6 polynomial and thereby map value 32 to zero. A look ahead of 4 is sufficient except for two cases where it is 5 and 7 and these two cases can be managed without planning for a look-ahead of 7, as will be appreciated by those skilled in the art. As previously mentioned, the 38 sub-circulant address SCA[5:0] should be generated prior to processing a DSW/ISW and this is particularly true when processing short sectors (i.e., sectors having fewer than 4864 bits). For short sectors circulant address CA[5:0] and sub-circulant addresses SCA[4:0] combinations that map into the zero padding region should be avoided. This can be easily accomplished when the sub-circulant addresses SCA[4:0] are known prior to the generation of circulant addresses CA[5:0].

Determining the end of an ISW/DSW subword can be done by determining the number of skips in a single lane due to the address mapping into the zero padding region. This is part of determining if a maximum of 38 attempts have been made to generate a valid circulant address CA[5:0], at which point end of the ISW/DSW subword is indicated. Also note that the option to program the seed values for the circulant address LFSRs CA_LFSR explicitly remains for each of the 32 steps as opposed to generating them using another random generator. With regard to situations involving shortened sectors (fewer than 4864 bits), it is a requirement that there is a maximum of a single contiguous hole between the end of user data (CA: 32 or 33) and the start of parity bits at CA=34. This results in a limit on the value of the sub-circulant address SA generated for the circulant address CA 32, 33 regions and the. The sub-circulant LRSRs SA_LFSR should include this constraint and this can be accomplished using the table of FIG. 5 to constrain the generation of sub-circulant addresses SCA [4:0] given a particular circulant address CA[5:0].

Multiple bit errors in the communications channel 100 are easily connected via the parity check matrix H for the LDPC code (generated by cyclic shifts, as will be understood by those skilled in the art) and can destroy the desirable "short-cycle free" or "four-cycle free" property of the LDPC code, as will be appreciated by those skilled in the art. This effect is identified as a pseudo-cycle. A proper choice of the interleaver can reduce the number of pseudo-cycles, as will also be appreciated by those skilled in the art. The table below using script [4] includes the count of the number of pseudo-cycles for the various interleavers listed:

| Interleaver | Pseudo-Cycle Count | Burst Limit |
| --- | --- | --- |
| IAG circuitry 109b | 40890 | 353 bits |
| Relative Prime Interleaver | 51341 | 357 bits |
| By-lane Mapper | 42490 | 359 bits |
| Sequential Interleaver | 269769 | 308 bits |
| Pass-Through Interleaver | 380984 | 252 bits |

Figure 6:
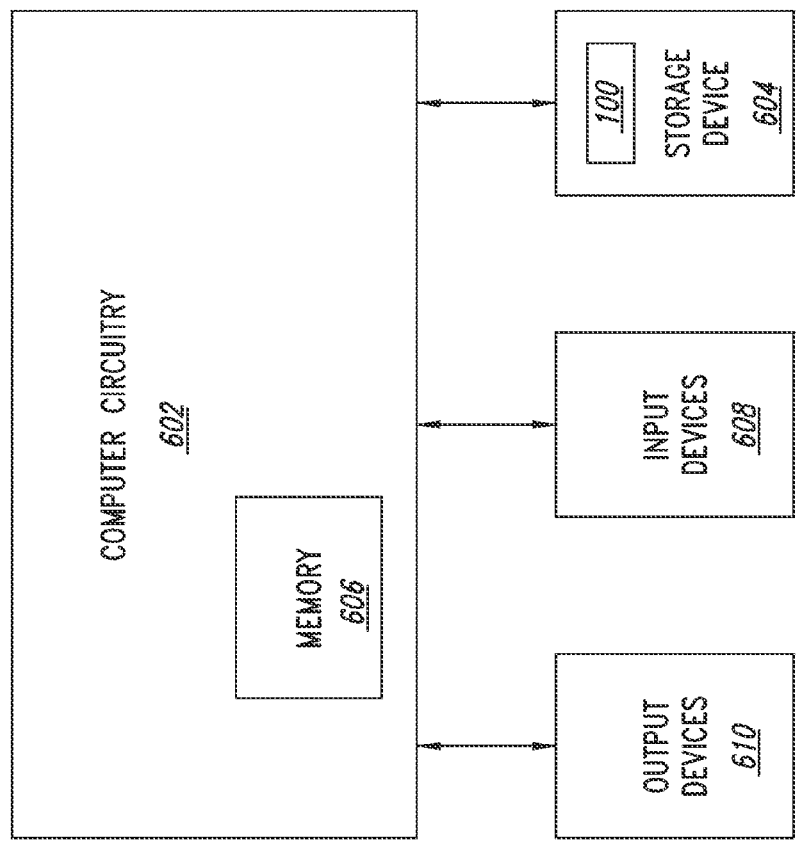
FIG. 6 is a functional block diagram of a computer system including computer circuitry coupled to a data storage device that includes the communications channel of FIG. 4 according to another embodiment of the present invention.

FIG. 6 is a functional block diagram of an electronic system 600 such as a computer system including electronic circuitry 602 such as computer circuitry coupled to a data storage device 604 that includes the communications channel 100 of FIG. 1 which, in turn, includes the IAG circuitry 109b of FIG. 4. Typically, the computer circuitry 602 also includes memory 606, typically random access memory (RAM), for storing data and programming instructions when executing software for performing various computing functions, such as software like word processors or spreadsheets to perform specific calculations or tasks. When executing software the computer circuitry 602 also accesses data stored in the data storage device 604 through the communications channel 100. The data storage device 604 may be a hard or floppy magnetic disk, tape cassette, compact disk read-only (CD-ROM) and compact disk read-write (CD-RW) memory, digital video disk (DVD), FLASH memory, or other suitable storage device. The computer system 600 further includes one or more input devices 608, such as a keyboard or a mouse, coupled to the computer circuitry 602 to allow an operator to interface with the computer system. Typically, the computer system 600 also includes one or more output devices 610 coupled to the computer circuitry 602, such as a printer, a video display, sound system, and so on.

Figure 7:
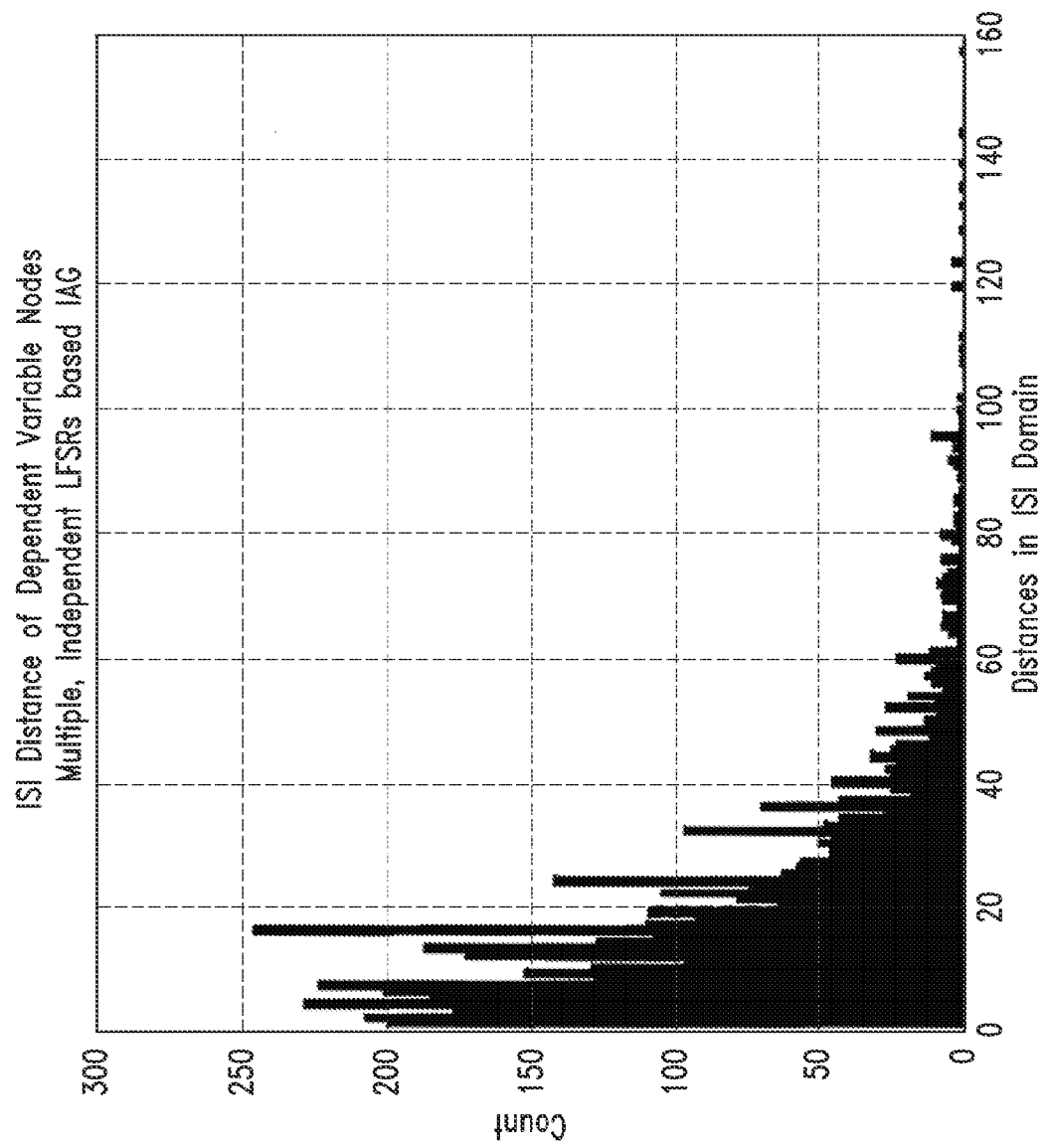
FIG. 7 is a histogram of distances in the ISI domain between any two variable nodes that participate in a given check node equation for an interleaver including the IAG circuitry of FIG. 4.
Figure 8:
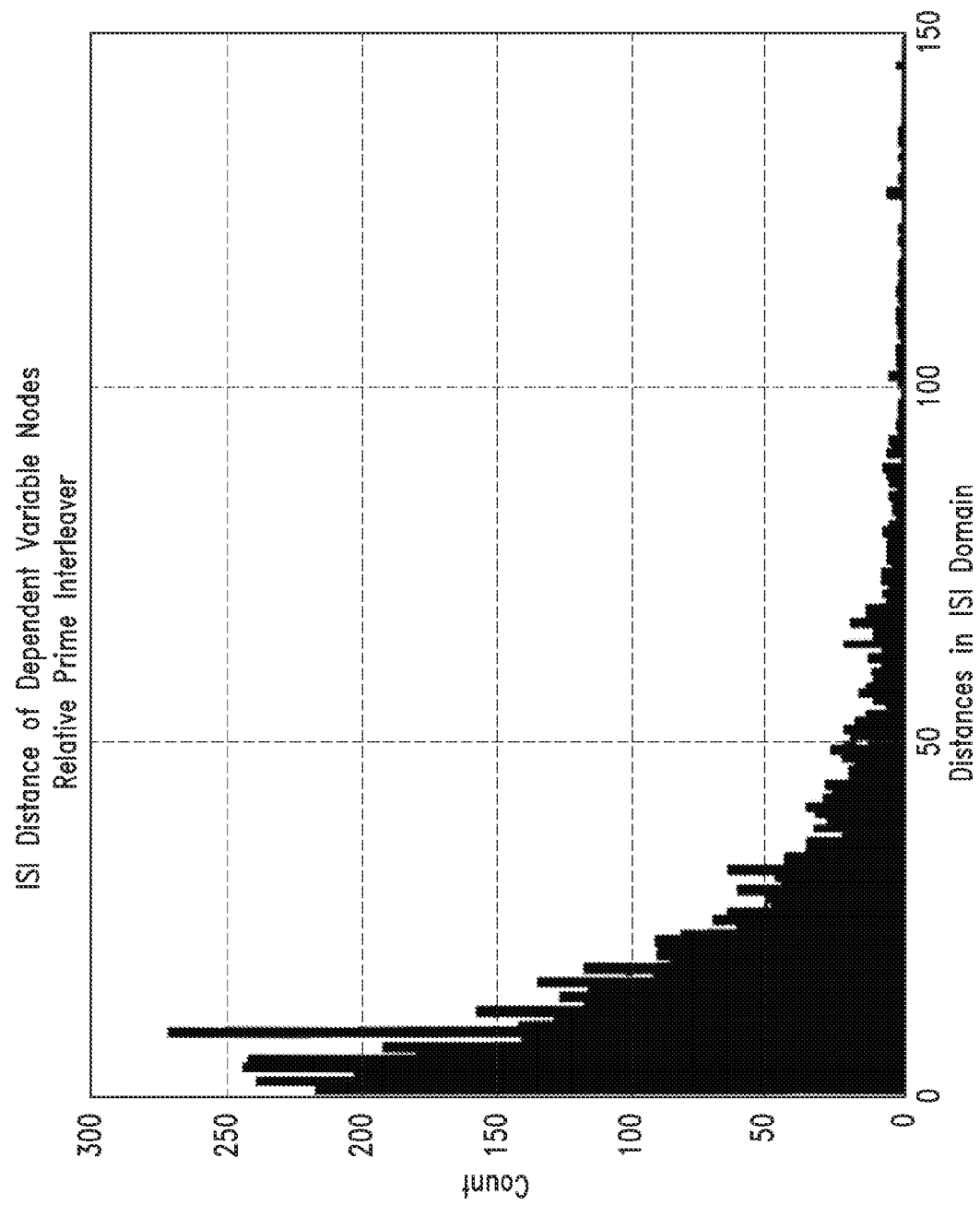
FIG. 8 is a histogram of distances in the ISI domain between any two variable nodes that participate in a given check node equation for a relative prime interleaver.
Figure 9:
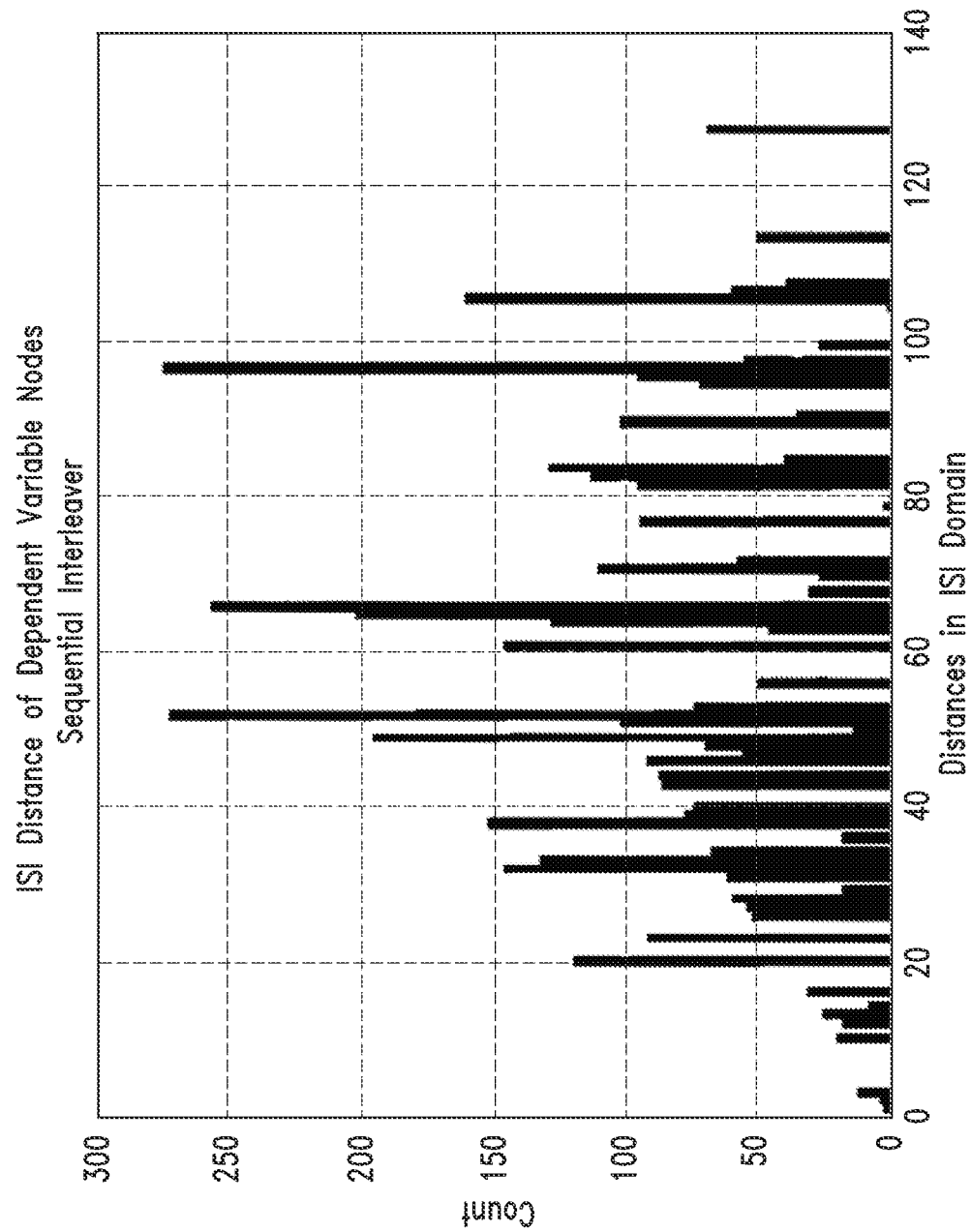
FIG. 9 is a histogram of distances in the ISI domain between any two variable nodes that participate in a given check node equation for a sequential interleaver.

FIG. 7 is a histogram of distances in the ISI domain between any two variable nodes that participate in a given check node equation for an interleaver including the IAG circuitry 109b of FIG. 4. FIG. 8 is a histogram of distances in the ISI domain between any two variable nodes that participate in a given check node equation for a relative prime interleaver. FIG. 9 is a histogram of distances in the ISI domain between any two variable nodes that participate in a given check node equation for a sequential interleaver. In FIGS. 7-9, for any two variable nodes or bit nodes that participate in a check node equation, the corresponding locations of the two variable nodes in the ISI domain (via ISW subwords generated by the interleaver 109a of FIG. 1) and the absolute distance between them is shown these figures for these three interleavers.

Figure 10:
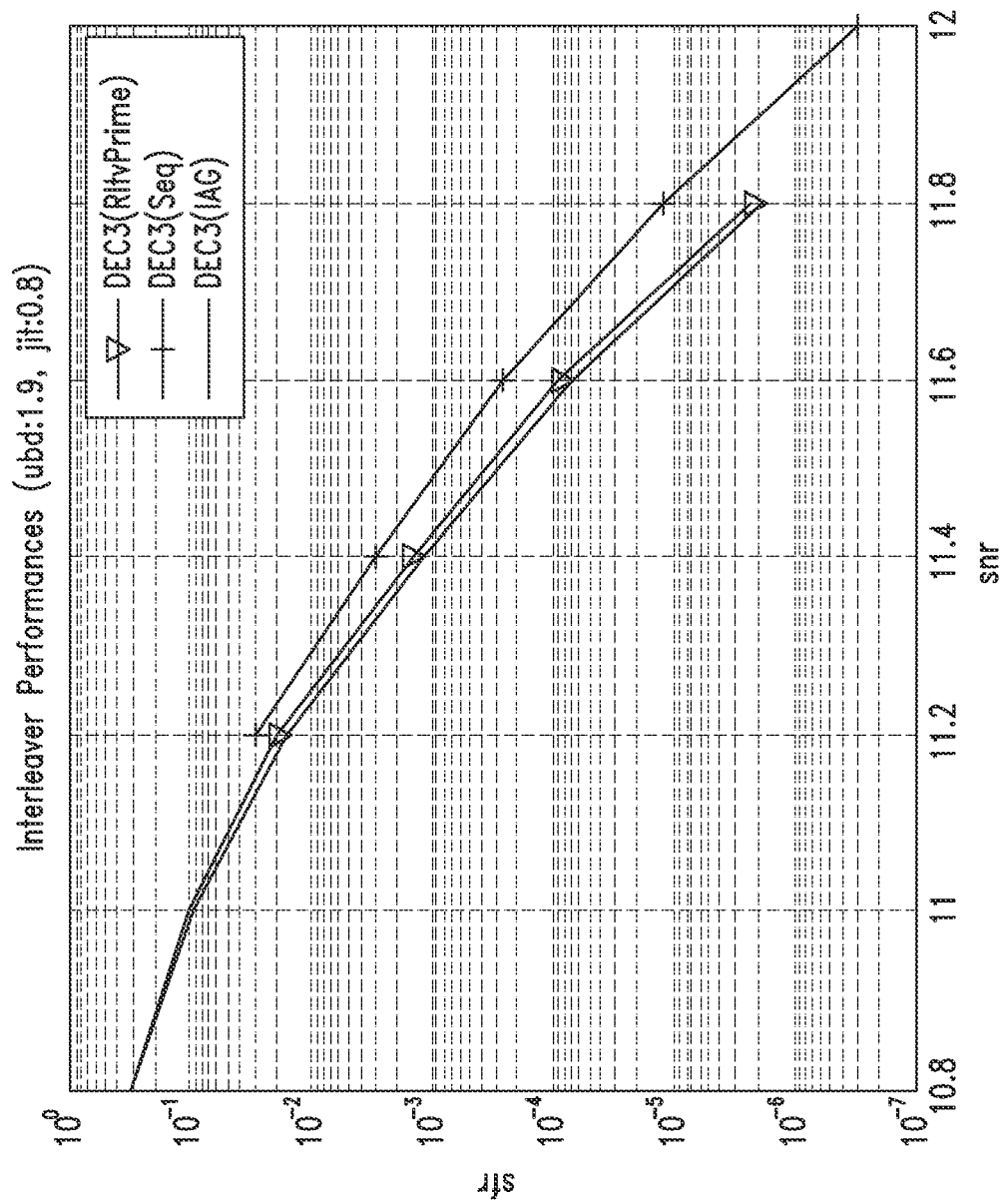
FIG. 10 is a graph showing the showing the sector failure rate (SFR) versus the signal to noise ratio (SNR) for a communications channel utilizing the IAG circuitry of FIG. 4.

FIG. 10 is a graph showing the showing the sector failure rate (SFR) versus the signal to noise ratio (SNR) for a communications channel utilizing the IAG circuitry of FIG. 4. The vertical axis is sector failure rate (SFR) and the horizontal axis signal-to-noise ratio (SNR). Performance is shown for a sequential interleaver, relative prime interleaver, and an interleaver using the IAG circuitry 109b of FIG. 4. As seen in this graph the performance of the IAG circuitry 109b is comparable to that of a relative prime interleaver.

One skilled in the art will understand that even though various embodiments and advantages of the present invention have been set forth in the foregoing description, the above disclosure is illustrative only, and changes may be made in detail, and yet remain within the broad principles of the invention. Furthermore, components described above may be implemented using digital circuitry or, where appropriate, may be realized through software executing on suitable processing circuitry. Therefore, the present invention is to be limited only by the appended claims.

What is claimed is:

1. A non-transitory computer-readable storage medium containing software instructions which, when executed by a computer, cause the computer to perform the method comprising:
  interleaving a block of data containing a plurality of subwords, the interleaving including the operations of,
    for each subword having and N columns and M rows defining an array space,
    generating a land address corresponding to one of the N columns;
    providing for each of the N columns a seed value to a linear feedback shift register;
    clocking the linear feedback shift register to generate pseudo random circulant addresses;
    providing a seed value to a linear feedback shift register to generate subcirculant addresses; and
    permuting bits of a data block in a first domain to different location in a data block in a second domain using the selected columns, circulant, and sub-circulant addresses.

2. The non-transitory computer-readable storage medium of claim 1,
  wherein providing for each of the N columns a seed value to a linear feedback shift er comprises providing the seed value to the linear feedback shift register having a degree of 5; and
  wherein providing a seed value to a linear feedback shift register to generate subcirculant addresses comprises providing the seed value to the linear feedback shift register having a degree of 6.

3. The non-transitory computer-readable storage medium of claim 1 further comprising software instructions which, when executed by a computer, cause the computer to perform the operation of deinterleaving the bits in the block of data in the second domain to the first domain.

4. The non-transitory computer-readable storage medium of claim 3, wherein the computer comprises one of a personal computer and a smart phone.

5. The non-transitory computer-readable storage medium of claim 4 further comprising instructions for instructing a computer to perform the operation of deinterleaving the bits in the block of data in the second domain to the first domain.

6. A non-transitory computer-readable storage medium containing software instructions which, when executed b a computer, cause the computer to perform the method comprising:
  interleaving a block of data containing a plurality of subwords, the interleaving including the operations of,
    for each subword having and N columns and M rows defining an array space,
    generating a land address corresponding to one of the N columns;
    providing for each of the N columns a seed value to a linear feedback shift resister of degree 5;
    clocking the linear feedback shift register to generate pseudo random circulant addresses;
    providing a seed value to a linear feedback shift register of degree 6 to generate subcirculant addresses; and
    permuting bits of a data block in a first domain to different location in a data block in a second domain using the selected columns, circulant, and sub-circulant addresses.

7. A method, comprising:
  generating addresses for permuting a data block in a first domain to a data block in a second domain on a subword basis using a plurality of linear feedback shift registers;
  generating lane addresses for each subword; and
  generating circulant addresses and sub-circulant addresses to map bits in each subword in the data block in the first domain to a corresponding subword in the second domain using the linear feedback registers.

8. The method of claim 7, wherein each subword includes an array space including N columns and M rows, and wherein the method further comprises selecting one of the N columns of the array space for which mapping addresses are generated.

9. The method of claim 7,
  wherein there are N linear feedback shift registers, and
  wherein the method further comprises generating circulant addresses for a corresponding column in the array space of a given subword using a respective one of the N linear feedback shift registers for each column.

10. The method of claim 9 further comprising providing an independent seed value to each of the N linear feedback shift registers.

11. The method of claim 10,
  wherein there are P linear feedback shift registers where P is the number of subwords contained in each data block, and
  wherein the method further comprises generating sub-circulant addresses for a corresponding subword using a respective one of the P linear feedback shift registers.

12. A method, comprising:
  receiving input message bits and operable to encode these input message bits and store this encoded data on a storage medium;
  generating addresses using a plurality of linear feedback shift registers, the addresses being used to interleave user and parity data in a decoder domain to interleaved codewords in an ISI domain;
  writing the interleaved codewords onto a storage medium;
  reading encoded data stored on the storage medium;
  decoding this encoded data to output the input message bits originally supplied;
  generating addresses using a plurality of linear feedback shift registers, the addresses being used to deinterleave encoded data stored on the storage medium in the ISI domain to deinterleaved codewords in an ISI domain.

13. The method of claim 12, wherein writing the interleaved codewords onto a storage medium comprises cyclic redundancy check (CRC) and run length limited (RLL) encoding.

14. The method of claim 13, wherein reading encoded data stored on the storage medium comprises CRC and RLL decoding.

15. The method of claim 13, wherein the storage medium comprises a magnetic storage media.

* * * * *